United States Patent
Li et al.

(10) Patent No.: US 12,107,759 B2
(45) Date of Patent: Oct. 1, 2024

(54) PACKET PROCESSING METHOD AND APPARATUS, AND COMPUTER STORAGE MEDIUM

(71) Applicant: Huawei Technologies Co., Ltd., Shenzhen (CN)

(72) Inventors: Cheng Li, Beijing (CN); Zhenbin Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 17/552,210

(22) Filed: Dec. 15, 2021

(65) Prior Publication Data

US 2022/0109624 A1    Apr. 7, 2022

Related U.S. Application Data

(63) Continuation of application No. PCT/CN2020/096662, filed on Jun. 17, 2020.

(30) Foreign Application Priority Data

Jun. 17, 2019  (CN) .......................... 201910523355.1

(51) Int. Cl.
*H04L 45/00* (2022.01)
*H04L 45/021* (2022.01)
*H04L 45/74* (2022.01)

(52) U.S. Cl.
CPC ............ *H04L 45/34* (2013.01); *H04L 45/021* (2013.01); *H04L 45/74* (2013.01)

(58) Field of Classification Search
CPC ........ H04L 45/34; H04L 45/021; H04L 45/74
(Continued)

(56) References Cited

U.S. PATENT DOCUMENTS

| | | | |
|---|---|---|---|
| 2006/0259602 A1* | 11/2006 | Stewart .................. | H04L 67/51 709/223 |
| 2016/0164779 A1* | 6/2016 | Xu .......................... | H04L 45/38 370/392 |

(Continued)

FOREIGN PATENT DOCUMENTS

| | | |
|---|---|---|
| CN | 103036877 A | 4/2013 |
| CN | 105871721 A | 8/2016 |

(Continued)

OTHER PUBLICATIONS

A new method for encoding MPLS segment routing TE paths Rabah Guedrez; Olivier Dugeon; Samer Lahoud; Géraldine Texier 2017 8th International Conference on the Network of the Future (NOF) Year: 2017 | Conference Paper | Publisher: IEEE (Year: 2017).*

(Continued)

*Primary Examiner* — Jeffrey R Swearingen
(74) *Attorney, Agent, or Firm* — Slater Matsil, LLP

(57) ABSTRACT

This application discloses a packet processing method and apparatus, and a computer storage medium, and belongs to the field of segment routing technologies. In the method, the network node receives a packet carrying an SRH, where the SRH includes one or more TLV fields and a TLV processing attribute, the TLV processing attribute indicates whether the network node needs to process the TLV fields included in the SRH, and the network node determines, based on the TLV processing attribute, processing of the TLV fields included in the SRH. In this way, any segment endpoint node on a segment routing network may determine the TLV processing attribute by using the SRH, so as to determine whether the TLV fields included in the SRH need to be processed.

16 Claims, 4 Drawing Sheets

(58) Field of Classification Search
USPC .......................................................... 709/238
See application file for complete search history.

(56) References Cited

U.S. PATENT DOCUMENTS

| | | | |
|---|---|---|---|
| 2017/0005922 | A1 | 1/2017 | Tantsura et al. |
| 2018/0375763 | A1 | 12/2018 | Brissette et al. |
| 2019/0104058 | A1* | 4/2019 | Filsfils ................ H04L 41/0246 |
| 2020/0099611 | A1* | 3/2020 | Filsfils .................... H04L 69/22 |
| 2020/0120022 | A1* | 4/2020 | Stammers ........... H04L 12/4633 |

FOREIGN PATENT DOCUMENTS

| | | | | |
|---|---|---|---|---|
| CN | 106656449 | A | 5/2017 | |
| CN | 107181689 | A | 9/2017 | |
| CN | 108156077 | A | 6/2018 | |
| CN | 108702328 | A | 10/2018 | |
| CN | 108737128 | A | 11/2018 | |
| CN | 108989212 | A | 12/2018 | |
| CN | 109076018 | A | 12/2018 | |
| CN | 109379359 | A | 2/2019 | |
| CN | 109756425 | A | 5/2019 | |
| WO | WO-2017141079 | A1 * | 8/2017 | ......... H04L 12/4633 |
| WO | 2019011114 | A1 | 1/2019 | |

OTHER PUBLICATIONS

A new method for encoding MPLS segment routing TE paths Rabah Guedrez; Olivier Dugeon; Samer Lahoud; Géraldine Texier 2017 8th International Conference on the Network of the Future (NOF) Year: 2017 | Conference Paper | Publisher: IEEE (Year: 2017) (Year: 2017).*

Filsfils, C. et al., "Segment Routing Architecture," Internet Engineering Task Force (IETF), Request for Comments: 8402, Category: Standards Track, ISSN: 2070-1721, XP002806570, Jul. 2018, 32 pages.

Previdi, S. et al., IS-IS Extension for Segment Routing draft-ietf-isis-segment-routing-extensions-25, IS-IS for IP Internets, Internet-Draft, Intended Status: Standards Track, Expires: Nov. 20, 2019, XP002806569, May 19, 2019, 37 pages.

Cisco Systems et al., "Pseudo-CR on SRv6 extensibility", 3GPP TSG-CT WG4 Meeting #91, C4-192023, May 13-17, 2019, 2 pages, Reno, US.

He Xiaoming et al, Study on segment routing network and its application in traffic engineering, Telecommunications Scienc, 2016, 9 pages.

Herbert, T., "Simple Segment Routing Header" draft-herbert-simple-sr-00, Internet-Draft , Mar. 11, 2019, 10 pages.

3GPP TR 29.892 V1.2.0 (May 2019)3rd Generation Partnership Project; Technical Specification Group Core Network and Terminals; Study on User Plane Protocol in 5GC.(Release 16), 49 pages.

* cited by examiner

| Type of a next packet header (Next Header) | SRH length (Hdr Ext Len) | Routing type (Routing Type) | Segment left (Segment Left) |
|---|---|---|---|
| Index of the last element (Last Entry) | Flags (Flags) in a data packet (Flags) | Data packets in a same group (Tag) | |
| SID | | | |
| SID | | | |
| ... | | | |
| SID | | | |
| One or more TLVs | | | |

| 0 | 63 | 127 |
|---|---|---|
| Locator (Locator) | | Function (Function) |

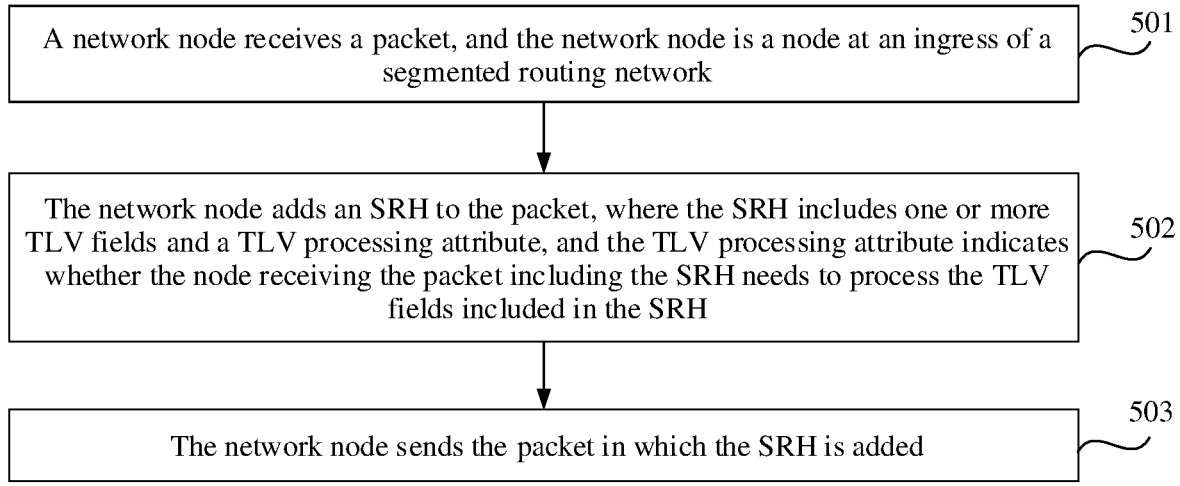
FIG. 5
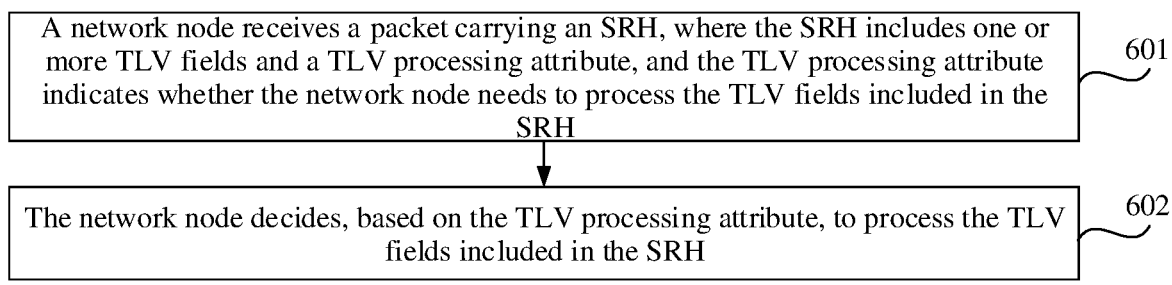
FIG. 6
| Type (Type) | Length (Length) | Bitmap (Bitmap) |
|---|---|---|
| Value (Value) ||| 
FIG. 7
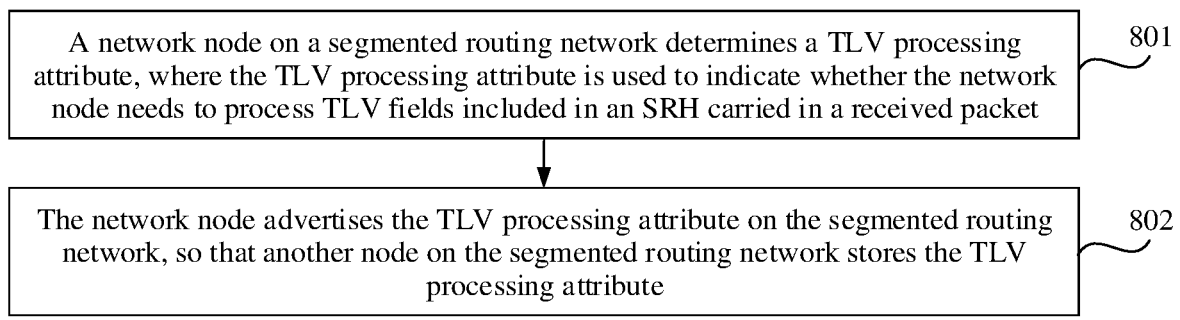
FIG. 8

PACKET PROCESSING METHOD AND APPARATUS, AND COMPUTER STORAGE MEDIUM

CROSS-REFERENCE TO RELATED APPLICATIONS

This application is a continuation of International Application No. PCT/CN2020/096662, filed on Jun. 17, 2020, which claims priority to Chinese Patent Application No. 201910523355.1, filed on Jun. 17, 2019. The disclosures of the aforementioned applications are hereby incorporated by reference in their entireties.

TECHNICAL FIELD

This application relates to the field of segment routing (SR) technologies, and in particular, to a packet processing method and apparatus, and a computer storage medium.

BACKGROUND

An SR technology is a routing technology in which a forwarding path is deployed at an ingress of a network. The SR technology may be applied to an internet protocol version 6 (IPv6)-based network. In this case, the network may also be referred to as an SRv6 network. A segment routing header (SRH) is encapsulated into a packet forwarded on the SRv6 network. The SRH includes a field used to indicate a forwarding path and a plurality of type-length-value (TLV) fields. Different TLV fields carry different indication information. For example, a specific TLV field may carry a fault diagnosis request, which is used to indicate a node on the SRv6 network to perform fault diagnosis. Therefore, when receiving the packet including the SRH, the node on the SRv6 network needs to process the packet, to determine operations that the node needs to perform.

In a related technology, a node having a segment routing function at an ingress of the SRv6 network is referred to as a head node, and another node having the segment routing function is referred to as a segment endpoint node. For any segment endpoint node on the SRv6 network, when obtaining a packet that is delivered by the head node or the another segment endpoint node and that includes the SRH, the segment endpoint node parses the packet to determine the plurality of TLV fields included in the SRH. For each TLV field, the segment endpoint node determines, according to a locally configured TLV processing policy, whether the TLV field needs to be processed, that is, determines whether a subsequent operation needs to be performed based on indication information carried in the TLV field. If the TLV field needs to be processed, the subsequent operation is performed based on the indication information. If the TLV field does not need to be processed, the subsequent operation does not need to be performed based on the indication information.

In the foregoing method, the segment endpoint node determines, according to the locally configured TLV processing policy, the TLV fields included in the SRH. Consequently, flexibility of packet processing by the segment endpoint node is relatively low.

SUMMARY

This application provides a packet processing method and apparatus, and a computer storage medium, to improve flexibility of packet processing by a node on a segment routing network. The technical solutions are as follows:

According to a first aspect, a packet processing method is provided. In the method, the network node receives a packet carrying an SRH. The SRH includes one or more TLV fields and a TLV processing attribute. The TLV processing attribute indicates whether the network node needs to process the TLV fields included in the SRH. Further, the network node determines, based on the TLV processing attribute, processing of the TLV fields included in the SRH.

In this instance of this application, in the foregoing manner, any segment endpoint node on a segment routing network may determine the TLV processing attribute by using the SRH, so as to uniformly determine whether to process the TLV fields included in the SRH. In this way, the segment endpoint node does not need to independently determine, by using a locally configured policy, the TLV fields included in the SRH, so as to improve efficiency of determining, by the segment endpoint node, whether to process the TLV fields.

Optionally, the SRH further includes a plurality of SIDs that are in a one-to-one correspondence with a plurality of segment endpoint nodes on a forwarding path of the packet. The plurality of segment endpoint nodes are nodes that have a segment routing function on the forwarding path of the packet. The network node is any one of the segment endpoint nodes. In this way, the TLV processing attribute may be set in a SID corresponding to the network node.

Because the SRH further includes the plurality of SIDs that are in the one-to-one correspondence with the plurality of segment endpoint nodes on the forwarding path of the packet, setting the TLV processing attribute by using the SID can avoid too much modification of a format of the existing SRH. This facilitates promotion of the packet processing method provided in this application.

Optionally, the TLV processing attribute may be set through a function type of the SID corresponding to the network node, or the TLV processing attribute may be set through a field in the SID corresponding to the network node. Flexibility of setting the TLV processing attribute is improved.

Optionally, in a process in which the network node decides, based on the TLV processing attribute, to process the TLV fields included in the SRH, the network node may obtain the TLV processing attribute from the corresponding SID. If the TLV processing attribute indicates that the TLV fields included in the SRH need to be processed, the network node identifies, from the TLV fields included in the SRH, a TLV field processed by the network node, and processes the identified TLV field. If the TLV processing attribute indicates that the TLV fields included in the SRH do not need to be processed, the network node directly skips processing the TLV fields included in the SRH.

After it is determined that the TLV fields need to be processed, in the foregoing manner, TLV fields that need to be processed in the TLV fields included in the SRH may be further determined, so that a specified node processes a specified TLV field, and flexibility of packet processing is improved.

Optionally, in a process in which the network node identifies, from the TLV fields included in the SRH, the TLV field processed by the network node, the network node may determine whether the TLV field included in the SRH includes a bitmap field. The bitmap field is used to specify a node that processes a TLV field to which the bitmap field belongs. For a TLV field that does not include the bitmap field, the network node directly treats the TLV field as the TLV field processed by the network node. For a TLV field that includes the bitmap field, the network node may further determine whether the network node is specified as a processing node in the bitmap field. If it is determined that the network node is specified as the processing node, the TLV field to which the bitmap field belongs is used as the TLV field processed by the network node.

A new bitmap field may be added to the TLV field to specify the node that processes the TLV field to which the bitmap field belongs, so as to further improve flexibility of packet processing.

Optionally, the SRH further includes a TLV type, and the TLV type indicates whether the bitmap field is included, so that the network node determines, based on the TLV type, whether the TLV fields included in the SRH include the bitmap field.

Whether the TLV fields include the bitmap field may be indicated by using the TLV type, so as to improve efficiency of determining whether the TLV fields include the bitmap field.

Optionally, the bitmap field includes a plurality of bits in a one-to-one correspondence with each SID in the packet, and a sequence of the plurality of bits corresponds to a sequence of each SID. In this way, in a process in which the network node further determines whether the network node is specified as the processing node in the bitmap field, a remaining node SL field included in the SRH of the packet is obtained. The SL field can indicate a quantity of remaining segment endpoint nodes that do not participate in packet forwarding on the forwarding path. A bit corresponding to the network node may be determined based on the quantity indicated by the SL field. Whether the bit corresponding to the network node specifies the network node as the processing node is determined.

For any TLV field, the bit corresponding to the network node in the bitmap field may be directly determined through an existing SL field in the SRH, so as to quickly determine whether the TLV field needs to be processed.

Optionally, in the method, the network node advertises a TLV processing capability notification packet for a specified TLV field on the segment routing network, so that another node on the segment routing network determines, based on the TLV processing capability notification packet, whether the network node has a capability of processing the specified TLV field. To avoid a case in which the SRH indicates a node to process a TLV field, but the node cannot process the TLV field, each node may advertise in advance on the segment routing network whether the node has a capability of processing a specified TLV field, so as to ensure smooth packet processing.

According to a second aspect, a packet processing method is provided. In the method, a network node receives a packet, and the network node is a node at an ingress of a segment routing network. Then, the network node adds an SRH to the packet, where the SRH includes one or more TLV fields and a TLV processing attribute. The TLV processing attribute indicates whether a node receiving the packet carrying the SRH needs to process the TLV fields included in the SRH. Then, the network node sends the packet to which the SRH is added.

When a head node on the segment routing network sends, in the foregoing manner, the packet including the SRH, any segment endpoint node on the segment routing network may determine, in the foregoing manner, the TLV processing attribute by using the SRH, so as to determine whether the TLV fields included in the SRH need to be processed. In this way, the segment endpoint node does not need to independently determine, by using a locally configured policy, the TLV fields included in the SRH, so as to improve efficiency of determining, by the segment endpoint node, whether to process the TLV fields.

Optionally, the SRH further includes a plurality of SIDs that are in a one-to-one correspondence with a plurality of segment endpoint nodes on a forwarding path of the packet. The plurality of segment endpoint nodes are nodes that have a segment routing function on the forwarding path of the packet. The TLV processing attribute is set in a SID corresponding to each segment endpoint node.

Because the SRH further includes the plurality of SIDs that are in the one-to-one correspondence with the plurality of segment endpoint nodes on the forwarding path of the packet, setting the TLV processing attribute by using the SID can avoid too much modification of a format of the existing SRH. This facilitates promotion of the packet processing method provided in this application.

Optionally, the TLV processing attribute may be set through a function type of the SID of each segment endpoint node. Alternatively, the TLV processing attribute is set through a field in the SID of each segment endpoint node. Therefore, flexibility of setting the TLV processing attribute is improved.

Optionally, when the TLV processing attribute indicates that the TLV fields included in the SRH need to be processed, the SRH further indicates a processing node of each TLV field included in the SRH. In this manner, after determining the TLV fields that need to be processed, any segment endpoint node on the segment routing network may further continue to determine which TLV fields in the TLV fields included in the SRH need to be processed, so that a specified node processes a specified TLV field, and flexibility of packet processing is improved.

Optionally, the TLV fields in the SRH include a bitmap field. The bitmap field is used to specify a node that processes a TLV field to which the bitmap field belongs. A new bitmap field may be added to the TLV field to specify the node that processes the TLV field to which the bitmap field belongs, so as to further improve flexibility of packet processing.

Optionally, in this method, the network node may further receive a TLV processing capability notification packet that is for a specified TLV field and that is advertised by another node. The TLV processing capability notification packet indicates whether the another node has a capability of processing the specified TLV field, and the another node is any one of a plurality of segment endpoint nodes on the forwarding path of the packet. In this way, the processing node that is of each TLV field included in the SRH and that is indicated in the SRH is determined based on the TLV processing capability notification packet.

To avoid a case in which the SRH indicates a node to process a TLV field, but the node cannot process the TLV field, each node may advertise in advance on the segment routing network whether the node has a capability of processing a specified TLV field. In this way, the head node may set, based on the TLV processing capability notification packet, the SRH that can indicate the specified node to process the specified TLV field, so as to ensure smooth packet processing.

According to a third aspect, a packet processing method is provided. The method includes: A network node on a segment routing network determines a TLV processing attribute, where the TLV processing attribute is used to indicate whether the network node needs to process TLV fields included in an SRH carried in a received packet; and the network node advertises the TLV processing attribute on the segment routing network, so that another node on the segment routing network stores the TLV processing attribute.

When any segment endpoint node on the segment routing network advertises the TLV processing attribute in the foregoing manner, the segment endpoint node may determine the TLV processing attribute by using the SRH in the foregoing manner, so as to determine whether to process the TLV fields included in the SRH. In this way, the segment endpoint node does not need to independently determine, by using a locally configured policy, the TLV fields included in the SRH, so as to improve efficiency of determining, by the segment endpoint node, whether to process the TLV fields.

Optionally, the TLV processing attribute is set in a SID corresponding to the network node. Because the SRH further includes the plurality of SIDs that are in the one-to-one correspondence with the plurality of segment endpoint nodes on the forwarding path of the packet, setting the TLV processing attribute by using the SID can avoid too much modification of a format of the existing SRH. This facilitates promotion of the packet processing method provided in this application.

Optionally, that the TLV processing attribute is set in the SID of the network node includes: The TLV processing attribute is set through a function type of the SID corresponding to the network node. Optionally, that the TLV processing attribute is set in the SID of the network node includes: The TLV processing attribute is set through a field in the SID corresponding to the network node.

In the foregoing two setting manners, the TLV processing attribute may be set in the function type of the SID, or the TLV processing attribute may be set in some fields in the SID, so as to improve flexibility of setting the TLV processing attribute.

According to a fourth aspect, a packet processing apparatus is provided.

The apparatus has a function of implementing behavior of the packet processing method in the first aspect. The apparatus includes at least one module, and the at least one module is configured to implement the packet processing method provided in the first aspect.

The apparatus has a function of implementing behavior of the packet processing method in the second aspect. The apparatus includes at least one module, and the at least one module is configured to implement the packet processing method provided in the second aspect.

Alternatively, the apparatus has a function of implementing behavior of the packet processing method in the third aspect. The apparatus includes at least one module, and the at least one module is configured to implement the packet processing method provided in the third aspect.

According to a fifth aspect, a packet processing apparatus is provided. A structure of the apparatus includes a processor and a memory, and the processor is configured to execute a program stored in the memory. An operation apparatus of the storage device may further include a communications bus, and the communications bus is configured to establish a connection between the processor and the memory.

The memory is configured to store a program that supports the apparatus in performing the packet processing method provided in the first aspect, and store data used to implement the packet processing method provided in the first aspect.

Alternatively, the memory is configured to store a program that supports the apparatus in performing the packet processing method provided in the second aspect, and store data used to implement the packet processing method provided in the second aspect.

Alternatively, the memory is configured to store a program that supports the apparatus in performing the packet processing method provided in the third aspect, and store data used to implement the packet processing method provided in the third aspect.

According to a sixth aspect, a computer-readable storage medium is provided, where the computer-readable storage medium stores instructions.

When the instructions are run on a computer, the computer is enabled to perform the packet processing method according to the first aspect.

Alternatively, when the instructions are run on a computer, the computer is enabled to perform the packet processing method according to the second aspect.

Alternatively, when the instructions are run on a computer, the computer is enabled to perform the packet processing method according to the third aspect.

According to a seventh aspect, a computer program product including instructions is provided.

When the computer program product runs on a computer, the computer is enabled to perform the packet processing method according to the first aspect.

Alternatively, when the computer program product runs on a computer, the computer is enabled to perform the packet processing method according to the second aspect.

Alternatively, when the computer program product runs on a computer, the computer is enabled to perform the packet processing method according to the third aspect.

According to an eighth aspect, a packet processing system is provided, where the system includes a head node and a plurality of segment endpoint nodes, the plurality of segment endpoint nodes are nodes that have a segment routing function on a forwarding path of a packet, and the head node is a node at an ingress of a segment routing network. The head node is configured to implement any one of the methods according to the second aspect, and for any segment endpoint node in the plurality of segment endpoint nodes, the segment endpoint node is configured to implement any one of the methods according to the first aspect.

In addition, the segment endpoint node is further configured to implement any one of the methods according to the first aspect.

BRIEF DESCRIPTION OF THE DRAWINGS

FIG. 5 is a flowchart of a packet processing method according to an embodiment of this application;

FIG. 6 is a flowchart of another packet processing method according to an embodiment of this application;

FIG. 7 is a schematic diagram of a format of a TLV field according to an embodiment of this application;

FIG. 8 is a flowchart of another packet processing method according to an embodiment of this application;

DETAILED DESCRIPTION OF ILLUSTRATIVE EMBODIMENTS

To make objectives, technical solutions, and advantages of this application clearer, the following further describes implementations of this application in detail with reference to the accompanying drawings.

Before a packet processing method provided in the embodiments of this application is described, an application scenario in the embodiments of this application is first described. SRv6 is a network architecture designed based on source routing to forward IPv6 packets on a network. A head node on an SRv6 network inserts an SRH into an IPv6 packet header and adds an IPv6 address list to the SRH. A segment endpoint node on the SRv6 network continually updates a destination address based on the IPv6 address list to forward the IPv6 packets one by one. The packet processing method provided in the embodiments of this application is applied to the foregoing SRv6 network.

Figure 1:
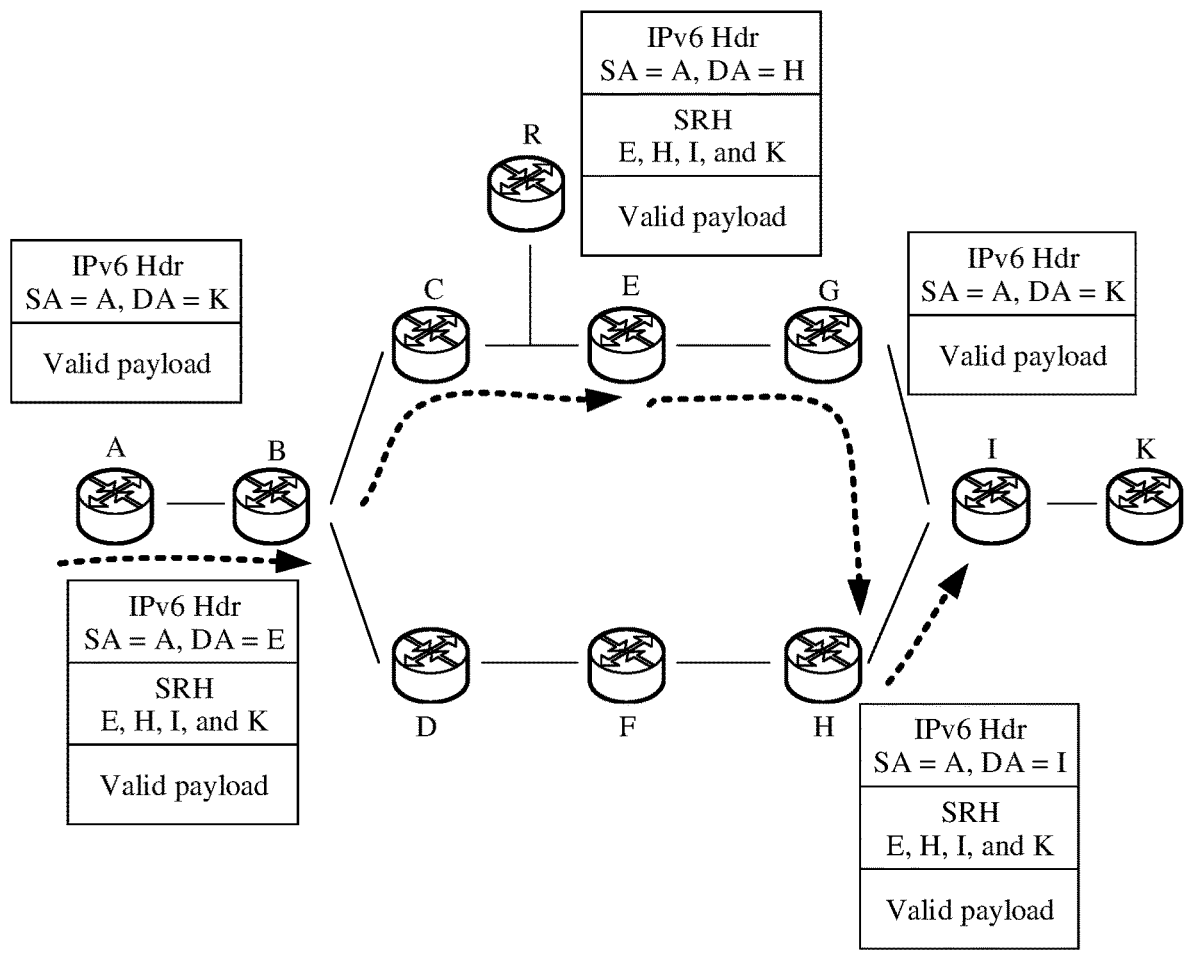
FIG. 1 is a schematic diagram of a packet processing system according to an embodiment of this application.

FIG. 1 is a schematic diagram of a packet processing system according to an embodiment of this application. As shown in FIG. 1, the system 100 includes a node A, a node B, a node C, a node D, a node E, a node F, a node G, a node H, a node I, a node K, and a node R.

The node A, the node C, the node D, the node G, and the node K do not have an SR function. The node B, the node R, the node E, the node F, the node H, and the node I have the SR function. If a node has the SR function, it means that a SID of the node is advertised in advance, so that the node can subsequently update a destination address of a packet based on a SID list in an SRH. Any node shown in FIG. 1 may be a device such as a router or a switch. In addition, a network including the system shown in FIG. 1 may also be referred to as a segment routing network.

A role of each node is preconfigured. For example, a controller on the network may be used to configure the node B as a head node of the segment routing network, and configure the node R, the node E, the node F, the node H, and the node I as segment endpoint nodes of the segment routing network. After the role of each node is configured, each node may process the packet based on the configured role when receiving the packet.

As shown in FIG. 1, the node B receives a packet sent by the node A. The packet may be an IPv6 protocol-based packet, and the packet includes an IPv6 header (Hdr) and a payload. A source address (SA) in the IPv6 packet header is the node A, and a destination address (DA) in the IPv6 packet header is the node K. Because the node B is the head node of the segment routing network, the node B may determine a forwarding path of the packet on the segment routing network. It is assumed that the forwarding path is the node B, the node C, the node E, the node G, the node H, and the node I. The node E, the node H, and the node I are nodes having the SR function, and three links including the three nodes constitute a segment routing link of the packet on the segment routing network. Therefore, the three nodes may also be referred to as segment endpoint nodes of the packet on the forwarding path of the segment routing network. The node B may add an SRH to a header of the packet, where the SRH not only includes addresses of the node E, the node H, and the node I, but also includes an address of the node K. In addition, the destination address in the IPv6 packet header is updated to node E based on the forwarding path. Then, the updated packet is sent to the node C. Because the node C does not have the SR function, after receiving the packet, the node C directly sends the received packet to the node E based on the forwarding path. After receiving the packet, the node E updates the destination address in the IPv6 packet header to the node H based on the forwarding path, and forwards the updated packet to the node H through the node G. A manner in which the node G processes the packet is the same as a manner in which the node C processes the packet. After receiving the packet, the node H updates the destination address in the IPv6 packet header to the node I based on the forwarding path, and forwards the updated packet to the node I. After receiving the packet, the node I determines, based on the forwarding path, that the node I is the last node on the forwarding path. In this case, the node I may directly delete the SRH in the packet, update the destination address in the IPv6 packet header to the node K, and send the processed packet to the node K. In the foregoing manner, the node A may send the packet to the node K through the segment routing network.

Figures 2, 3, 4:
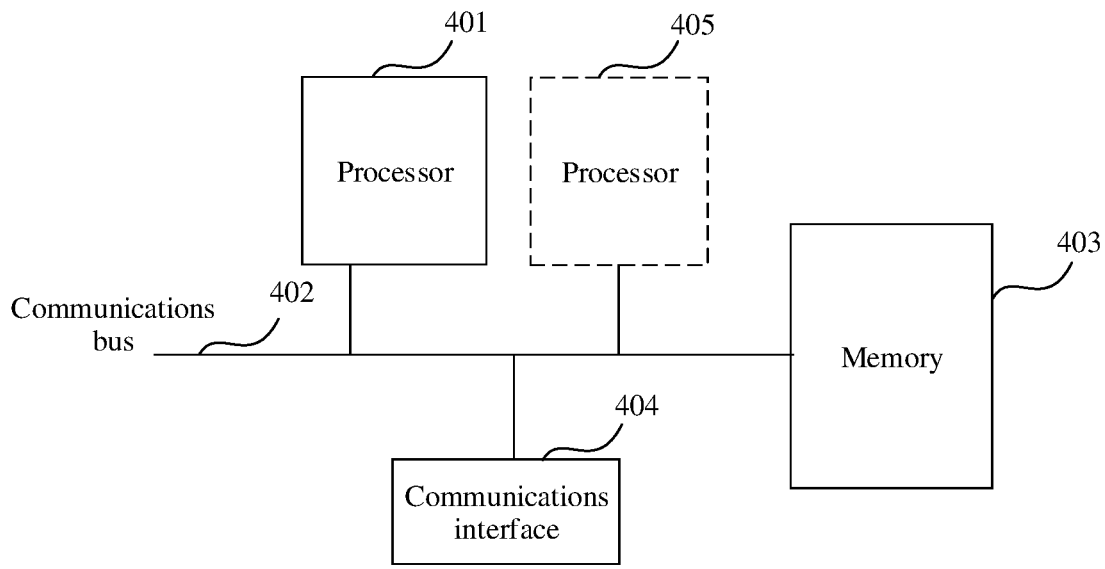
FIG. 2 is a schematic diagram of a format of an SRH according to an embodiment of this application.
FIG. 3 is a schematic diagram of a format of a SID according to an embodiment of this application.
FIG. 4 is a schematic diagram of a structure of a computer device according to an embodiment of this application.

FIG. 2 is a schematic diagram of a format of an SRH according to an embodiment of this application. As shown in FIG. 2, the SRH includes a field used to indicate a type of a next packet header, a field used to indicate a length of an SRH header (Hdr Ext Len), a field used to indicate a routing type, a field used to indicate a quantity of segment endpoint nodes (Segment Left, SL) that need to be accessed before a packet arrives the current node, where the field may also be referred to as a remaining node field, a field used to indicate an index of a last element (Last Entry), a field used to indicate some flags of a data packet, and a field used to indicate a packet (Tag) in a same group. The SRH further includes a segment identifier (SID) list field. The SID list field includes a plurality of SIDs, and each SID may be an IPv6 address, and is used to identify a node having the SID.

In some embodiments, as shown in FIG. 3, each SID is a 128-bit IPv6 address. Each SID may include two parts: a locator field and a function field. The locator field occupies high bits of 128 bits. The function field occupies low bits of the 128 bits.

In addition, as shown in FIG. 2, the SRH further includes optional TLV fields (optional type-length-value objects). Through the optional TLV fields, the SRH may implement more functions, for example, fault diagnosis detection.

FIG. 4 is a schematic diagram of a structure of a computer device according to an embodiment of this application. Any node in FIG. 1 may be implemented by using a computer device shown in FIG. 4. Refer to FIG. 4. The computer device includes at least one processor 401, a communications bus 402, a memory 403, and at least one communications interface 404.

The processor 401 may be a general-central processing unit (central processing unit, CPU), an application-specific integrated circuit (ASIC), or one or more integrated circuits configured to control program execution of solutions of this application. The processor may be configured to process a received packet, to implement the packet processing method provided in the embodiments of this application.

For example, when the head node in FIG. 1 is implemented by using the computer device shown in FIG. 4, the processor may be configured to add an SRH including a TLV processing attribute to the received packet, so that a subsequent segment endpoint node may decide, based on the TLV processing attribute, processing of the TLV fields. For specific function implementation, refer to a processing part of the head node in the method embodiment. For another example, when the segment endpoint node in FIG. 1 is implemented by using the computer device shown in FIG. 4, the processor may be configured to: obtain the TLV processing attribute from the received packet carrying the SRH, and determine, based on the TLV processing attribute, processing of the TLV fields. For specific function implementation, refer to a processing part of the segment endpoint node in the method embodiment.

The communications bus 402 may include a path used to transmit information between the foregoing components.

The memory 403 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing expected program code in a form of an instruction or a data structure and capable of being accessed by a computer. This is not limited thereto. The memory 403 may exist independently, and is connected to the processor 401 by using the communications bus 402. The memory 403 may alternatively be integrated with the processor 401.

The memory 403 is configured to store program code used to execute the solutions of this application, and the processor 401 controls execution. The processor 401 is configured to execute the program code stored in the memory 403. The program code may include one or more software modules. Any node shown in FIG. 1 may determine, by using the processor 401 and one or more software modules in the program code in the memory 403, data used for developing an application.

The communications interface 404 is any apparatus such as a transceiver, and is configured to communicate with another device or communications network, for example, an Ethernet, a radio access network (RAN), or a wireless local area network (WLAN). In this embodiment of this application, the communications interface may be configured to: receive a packet sent by another node on a segment routing network, or send a packet to another node on the segment routing network.

During specific implementation, in an embodiment, a computer device may include a plurality of processors, for example, a processor 401 and a processor 405 shown in FIG. 4. Each of these processors may be a single-core (single-CPU) processor, or may be a multi-core (multi-CPU) processor. The processor herein may be one or more devices, circuits, and/or processing cores configured to process data (for example, computer program instructions).

As shown in FIG. 1, a head node on the segment routing network adds the SRH to the received packet, and when receiving the packet including the SRH, each segment endpoint node on the segment routing network first determines whether to process the TLV fields included in the SRH, that is, determines a TLV processing policy. Subsequently, the next operation is performed according to the determined TLV processing policy. The following separately describes the foregoing two processes by using two embodiments.

FIG. 5 is a flowchart of a packet processing method according to an embodiment of this application. As shown in FIG. 5, the method includes the following steps.

Step 501: A network node receives a packet, where the network node is a node at an ingress of a segment routing network.

The network node in the embodiment shown in FIG. 5 is a head node on the segment routing network. For ease of subsequent description, the packet received by the head node is referred to as a first packet, As shown in FIG. 1, the head node is the node B, and the first packet is a packet sent by the node A. The first packet is an IPv6 protocol-based packet, and correspondingly, the first packet includes an IPv6 packet header and a payload.

Step 502: The network node adds an SRH to the packet, where the SRH includes one or more TLV fields and a TLV processing attribute, and the TLV processing attribute indicates whether a node that receives the packet including the SRH needs to process the TLV fields included in the SRH.

In this embodiment of this application, to avoid the TLV processing policy needs to be locally configured, the SRH may be used to indicate a new attribute: the TLV processing attribute. The TLV processing attribute is used to indicate whether the TLV fields need to be processed. Therefore, when the head node receives the first packet, the head node needs to first determine the SRH including the TLV processing attribute.

In some implementations, the SRH in step 502 further includes a plurality of SIDs that are in a one-to-one correspondence with a plurality of segment endpoint nodes. The plurality of segment endpoint nodes are nodes that have a segment routing function on a forwarding path of the packet. Therefore, the TLV processing attribute may be set in a SID corresponding to each segment endpoint node, and the TLV processing attribute set in each SID is used to indicate whether the segment endpoint node corresponding to the corresponding SID needs to process the TLV fields included in the SRH, so that the segment endpoint node on the subsequent forwarding path may determine the TLV processing attribute based on the corresponding SID. In some other embodiments, the TLV processing attribute may alternatively be set in another field of the SRH, to indicate whether each segment endpoint node needs to process the TLV fields included in the SRH. This is not specifically limited in this application.

For ease of subsequent description, the plurality of SIDs are referred to as a SID list. The SID list is determined by the head node or a controller on the segment routing network. The SID of each node on the segment routing network has been advertised on the network in advance. In other words, the head node or the controller on the segment routing network has learned the corresponding SID of each node before determining the SID list. Therefore, the head node or the network controller may directly determine the SID list according to a path algorithm. If the network controller determines the segment identifier SID list according to the path algorithm, the head node may obtain the SID list from the controller.

In some embodiments, that the TLV processing attribute is set in the SID corresponding to each segment endpoint node includes: The TLV processing attribute is set through a function type of the SID of each segment endpoint node. In other words, for a first segment endpoint node of the plurality of segment endpoint nodes, a SID corresponding to the first segment endpoint node corresponds to a function type, and a TLV processing attribute is set in the function type of the SID, so that the function type of the SID can indicate whether the first segment endpoint node needs to process the TLV field. For example, one bit may be selected from the SID corresponding to the first segment endpoint node to indicate the function type. In this case, the first segment endpoint node may determine the TLV processing attribute through the function type. Detailed content is described in the following embodiments. Details are not described herein again.

In other embodiments, that the TLV processing attribute is set in the SID of each segment endpoint node includes: The TLV processing attribute is set through a field in the SID of each segment endpoint node. In other words, for a first segment endpoint node of the plurality of segment endpoint nodes, a SID corresponding to the first segment endpoint node includes a TLV processing attribute field, and the TLV processing attribute field is used to indicate whether the first segment endpoint node needs to process the TLV field. In this case, the first segment endpoint node may determine the TLV processing attribute through the TLV processing attribute field included in the SID. Detailed content is also described in the following embodiments. Details are not described herein again.

In this embodiment of this application, for the first segment endpoint node of the plurality of segment endpoint nodes, if the TLV processing attribute indicates that the TLV field needs to be processed, for any TLV field included in the SRH, the first segment endpoint node may subsequently directly perform a subsequent operation based on indication information carried in the TLV field. The TLV processing attribute is set, and therefore, whether to process the TLV field included in the SRH may be determined through the SRH, so as to specify, through the SRH, which nodes need to process the TLV fields and which nodes do not need to process the TLV fields. The locally configured TLV processing policy does not need to be used to determine whether to process the TLV fields, so as to improve efficiency of determining whether to process the TLV fields.

Further, on the basis of setting the TLV processing attribute, each TLV field may be further set, so that the specified node processes the specified TLV field, and flexibility of packet processing is improved.

In some embodiments, the TLV processing attribute indicates that the TLV fields included in the SRH need to be processed, and the SRH further indicates a processing node of each TLV field included in the SRH. Therefore, for any segment endpoint node on the forwarding path, the SRH may be used to indicate a TLV field processed by the segment endpoint node.

An implementation of indicating, by the SRH, the processing node of each TLV field included in the SRH may be as follows: The TLV fields in the SRH may include a bitmap field, and the bitmap field is used to specify a node that processes a TLV field to which the bitmap field belongs. The TLV fields in the SRH may be all TLV fields or some TLV fields. This is not specifically limited. For example, for a first TLV field in one or more TLV fields, a bitmap field in the first TLV field indicates whether a node receiving a packet carrying the SRH can process the first TLV field, and the first TLV field is any one of the one or more TLV fields. When subsequently receiving the packet including the SRH, the first segment endpoint node determines, based on the TLV processing attribute, that the TLV fields included in the SRH need to be processed, and may further determine, based on the bitmap field of the first TLV field, whether the first TLV field needs to be processed.

In some embodiments, for the first TLV field, the bitmap field includes a plurality of bits that are in a one-to-one correspondence with the plurality of SIDs, each bit is used to indicate whether the segment endpoint node corresponding to the corresponding SID can process the first TLV field, and the first TLV field is any one of one or more TLV fields. With this setting, the first segment endpoint node may determine whether the first TLV field needs to be processed.

Setting of bits in the bitmap field is merely a possible implementation provided in this application. Certainly, the bitmap field may alternatively indicate, in another manner, specific nodes that can process the first TLV field and specific nodes that do not need to process the first TLV field. Details are not described in this embodiment of this application.

In addition, the SRH may further include a TLV type, and the TLV type indicates whether the bitmap field is included. For example, a bit may be selected from a type field of the TLV field to indicate whether the bitmap field is carried, so that the subsequent segment endpoint node quickly determines, based on a TLV type of the first TLV field, whether the bitmap field is included. Therefore, efficiency of determining, by the segment endpoint node, whether to process the first TLV field is improved.

In addition, any segment endpoint node on the network may further advertise a TLV processing capability notification packet for the specified TLV field in advance, and the TLV processing capability notification packet is used to notify another node on the segment routing network whether the segment endpoint node has a capability of processing the specified TLV field. In this case, the head node receives the TLV processing capability notification packet advertised by the segment endpoint node, where the TLV processing capability notification packet is used to notify whether the segment endpoint node has a capability of processing the specified TLV field. Correspondingly, the processing node that is of each TLV field included in the SRH and that is indicated in the SRH is determined based on the TLV processing capability notification packet.

For example, it is assumed that a bitmap field is used to indicate a TLV field processed by a node that receives the packet carrying the SRH, the specified TLV field is the first TLV field, and the segment endpoint node is the first segment endpoint node. In this case, a first bit in the bitmap field of the first TLV field may be obtained, where the first bit is a bit corresponding to the SID corresponding to the first segment endpoint node in the plurality of bits. The head node determines, based on the pre-received TLV processing capability notification packet, whether the first segment endpoint node has a capability of processing the first TLV field. If the first segment endpoint node has the capability of processing the first TLV field, the head node obtains a service requirement of the first segment endpoint node, determines whether the first segment endpoint node needs to process the first TLV field, and if the first segment endpoint node needs to process the TLV field, may set a bit value in the first bit to a value used to indicate that the first TLV field needs to be processed.

Step 503: The network node sends the packet to which the SRH is added.

For ease of subsequent description, a packet to which the head node adds the SRH is referred to as a second packet. After the head node sends the second packet, any segment endpoint node on the segment routing network may process the second packet by using the following embodiments.

FIG. 6 is a flowchart of a packet processing method according to an embodiment of this application. As shown in FIG. 6, the method includes the following steps:

Step 601: A network node receives a packet carrying an SRH, where the SRH includes one or more TLV fields and a TLV processing attribute, and the TLV processing attribute indicates whether the network node needs to process the TLV fields included in the SRH.

The network node in the embodiment shown in FIG. 6 may be any segment endpoint node on a segment routing network. For ease of subsequent description, any segment endpoint node on the segment routing network is referred to as a first segment endpoint node. Subsequent content is described by using the first segment endpoint node as an example. For a manner of processing a packet by another segment endpoint node on the segment routing network, refer to the first segment endpoint node.

It can be learned from the embodiment shown in FIG. 5 that the SRH in the second packet includes a plurality of SIDs that are in a one-to-one correspondence with the plurality of segment endpoint nodes, and the plurality of segment endpoint nodes are nodes that have a segment routing function on a forwarding path of the packet. As shown in FIG. 2, the plurality of SIDs may include four SIDs that are respectively in a one-to-one correspondence with segment endpoint nodes E, F, H, and I. The first segment endpoint node may be any one of the four segment endpoint nodes. Therefore, in some embodiments, the TLV processing attribute may be set in a SID corresponding to the first segment endpoint node, so that processing of the TLV fields included in the SRH is subsequently determined by using the following step 602.

Step 602: The network node decides, based on the TLV processing attribute, to process the TLV fields included in the SRH.

For the first segment endpoint node, when the TLV processing attribute is set in the SID corresponding to the first segment endpoint node, the first segment endpoint node may determine the TLV processing attribute based on the SID corresponding to the first segment endpoint node, and determine the processing of the TLV fields included in the SRH based on the TLV processing attribute.

Therefore, when receiving the second packet, the first segment endpoint node may first determine the SID corresponding to the first segment endpoint node from the plurality of SIDs, and then determine the TLV processing attribute based on the SID corresponding to the first segment endpoint node, so as to determine, by using the determined TLV processing attribute, whether the TLV fields included in the SRH need to be processed. In addition, in this embodiment of this application, it is predefined that the first attribute is an attribute in which the TLV fields need to be processed, and the second attribute is an attribute in which the TLV fields do not need to be processed.

For any network node on the segment routing network, when one SID of the network node is advertised, corresponding SID configuration information is further advertised, to indicate some functions of the node corresponding to the SID. According to this scenario, a function may be added to a function type of the SID in the SID configuration information, so that the function type of the SID can indicate whether the TLV fields need to be processed. In other words, the TLV processing attribute is set through the function type of the SID corresponding to the network node. Therefore, in some embodiments, an implementation in which the network node determines the TLV processing attribute in step 602 may be: The SID configuration information is obtained based on the SID corresponding to the first segment endpoint node. The SID configuration information includes the function type of the SID, and the function type of the SID can indicate whether the TLV fields need to be processed. The TLV processing attribute is determined based on the function type of the SID included in the SID configuration information.

For example, when the function type of the predefined SID is the first function type, the function type is used to indicate that the TLV fields need to be processed. When the function type of the SID is the second function type, the function type is used to indicate that the TLV fields do not need to be processed. In this case, if the function type of the SID included in the first SID configuration information is the first function type, it may be determined that the TLV processing attribute is the first attribute. Correspondingly, if the function type of the SID included in the first SID configuration information is the second function type, it may be determined that the TLV processing attribute is the second attribute.

The function type of the SID may be further used to indicate another function of the SID. Details are not described herein again.

Because a same node may have different SIDs, when obtaining the SID configuration information and the SID that corresponds to the first segment endpoint node and that is advertised in advance, the first segment endpoint node may store the SID corresponding to the first segment endpoint node and the SID configuration information in a correspondence between the SID and the SID configuration information. In this case, an implementation of obtaining the SID configuration information based on the SID corresponding to the first segment endpoint node may be: based on the SID corresponding to the first segment endpoint node, from the correspondence between the SID and the SID configuration information, obtaining the SID configuration information for the SID corresponding to the first segment endpoint node.

One SID of a node on the segment routing network and SID configuration information may be advertised by the node itself, or by a controller deployed on the segment routing network. This part of content is described in the following embodiments. Details are not described herein again.

The foregoing manner of determining the TLV processing attribute by using the function type of the SID may also be referred to as an implicit encoding manner.

In addition, as shown in FIG. 3, the SID includes a function field, and may also be used to indicate a function of a node corresponding to the SID. Therefore, in some other embodiments, that the TLV processing attribute is set in the SID of the network node includes: The TLV processing attribute is set through a field in the SID corresponding to the network node. An implementation in which the network node determines the TLV processing attribute in step 602 may further be: obtaining a TLV processing attribute field from the SID corresponding to the first segment endpoint node, where the TLV processing attribute field is used to indicate whether the TLV fields need to be processed; and determining the TLV processing attribute based on the TLV processing attribute field.

For example, if a bit value of the TLV processing attribute field is predefined as a first bit value, the bit value is used to indicate that the first segment endpoint node needs to process the TLV fields. If the bit value of the TLV processing attribute field is a second bit value, the bit value is used to indicate that the first segment endpoint node does not need to process the TLV fields. In this scenario, if the bit value of the TLV processing attribute field obtained from the SID corresponding to the first segment endpoint node is the first bit value, it is determined that the TLV processing attribute of the first segment endpoint node is the first attribute. Correspondingly, if the bit value of the TLV processing attribute field obtained from the SID corresponding to the first segment endpoint node is the second bit value, it is determined that the TLV processing attribute of the first segment endpoint node is the second attribute.

The TLV processing attribute field may be a part of field in the function field included in the SID. For example, a bit may be selected from the function field included in the SID to indicate the TLV processing attribute. This manner of determining the TLV processing attribute through the TLV processing attribute field may also be referred to as an explicit encoding manner.

The implicit encoding manner and the explicit encoding manner are merely two possible implementations in which the TLV processing attribute is set through the SID. In this embodiment of this application, the TLV processing attribute may be set in the SID in another manner. When the TLV processing attribute is set in the SID in another manner, the first segment endpoint node may also determine the TLV processing attribute in a manner of setting the TLV processing attribute. Details are not described herein again.

In addition, if the TLV processing attribute is set through another field in the SRH, the first segment endpoint node may also determine the TLV processing attribute by referring to the foregoing manner. Details are not described herein again.

After the TLV processing attribute of the first segment endpoint node is determined, if the TLV processing attribute is the first attribute, the first segment endpoint node processes the TLV fields included in the SRH. Correspondingly, if the TLV processing attribute is the second attribute, the first segment endpoint node determines that the TLV fields included in the SRH do not need to be processed. In this case, the first segment endpoint node does not need to perform a subsequent operation based on the indication information carried in the TLV field included in the SRH.

In addition, if the determined TLV processing attribute is the first attribute, for any TLV field included in the SRH, the first segment endpoint node may directly perform a subsequent operation based on indication information carried in the TLV field. Through the foregoing step 601 and step 602, the TLV processing attribute may specify which nodes need to process the TLV fields and which nodes do not need to process the TLV fields, without determining by using a locally configured TLV processing policy, so that efficiency of determining whether the TLV fields need to be processed is improved.

Further, based on the embodiment shown in FIG. 5, it can be learned that, on the basis of step 601 and step 602, after it is determined that the first segment endpoint node needs to process the TLV fields, it is further determined that which TLV fields in the TLV fields included in the SRH need to be processed by the first segment endpoint node, so that the specified node processes the specified TLV field, and flexibility of packet processing is improved.

Therefore, an implementation of step 602 may further be: The network node obtains the TLV processing attribute from the corresponding SID; and if the TLV processing attribute indicates that the TLV fields included in the SRH need to be processed, the network node identifies, from the TLV fields included in the SRH, a TLV field processed by the network node, and processes the identified TLV field; or if the TLV processing attribute indicates that the TLV fields included in the SRH do not need to be processed, the network node does not process the TLV fields included in the SRH.

In this embodiment of this application, for any TLV field included in the SRH, a bitmap field may be obtained from the TLV field through division, and the bitmap field is used to indicate which nodes on the forwarding path can process the TLV field. Therefore, an implementation in which the network node identifies, from the TLV fields included in the SRH, the TLV field processed by the network node may be: The network node determines whether the TLV fields included in the SRH include a bitmap field, where the bitmap field is used to specify a node that processes a TLV field to which the bitmap field belongs; for a TLV field that does not include the bitmap field, treats the TLV field as the TLV field processed by the network node; and for a TLV field that includes the bitmap field, the network node further determines whether the network node is specified as a processing node in the bitmap field, and if the network node is specified as the processing node, uses the TLV field to which the bitmap field belongs as the TLV field processed by the network node.

In other words, if the TLV processing attribute is used to indicate that the network node needs to process the TLV fields included in the SRH, and for a first TLV field in one or more TLV fields, if the first TLV field includes the bitmap field, processing of the first TLV field is determined based on the bitmap field. The bitmap field indicates whether the network node can process the first TLV field, and the first TLV field is any one of one or more TLV fields. In some embodiments, the bitmap field includes a plurality of bits in a one-to-one correspondence with a plurality of SIDs, and the plurality of SIDs are SIDs of the second packet. As shown in FIG. 7, if 16 SIDs are inserted into a SID list, a 16-bit field may be divided after a length field of the TLV field, and 16 bits are in a one-to-one correspondence with the 16 SIDs.

In addition, as shown in FIG. 2, the remaining node field included in the SRH may indicate a sequence of the SID corresponding to the first segment endpoint node in the plurality of SIDs. Therefore, in some embodiments, a sequence of the plurality of bits included in the bitmap field corresponds to a sequence of the plurality of SIDs. In this case, an implementation in which the network node further determines whether the network node is specified as the processing node in the bitmap field may be: obtaining an SL field included in the SRH of the packet, where the SL field can indicate a quantity of remaining segment endpoint nodes that do not participate in packet forwarding on the forwarding path; determining, based on the quantity indicated by the SL field, a bit corresponding to the network node; and determining whether the bit corresponding to the network node specifies the network node as the processing node.

For ease of subsequent description, a bit corresponding to the first segment endpoint node is referred to as a first bit. For example, a sequence of the plurality of bits from high bits to low bits is the same as that of the plurality of SIDs. If a quantity indicated by an SL field included in the SID corresponding to the first segment endpoint node is 0, it indicates that the first segment endpoint node is the last segment endpoint node in the forwarding path direction. In this case, the last bit in the plurality of bits may be determined as the first bit.

For another example, a sequence of the plurality of bits from low bits to high bits is the same as that of the plurality of SIDs. If a quantity indicated by an SL field included in the SID corresponding to the first segment endpoint node is 0, it indicates that the first segment endpoint node is the last segment endpoint node in the forwarding path direction. In this case, a first bit in the plurality of bits may be determined as the first bit.

Because the plurality of SIDs included in the SRH may also be referred to as a SID list, the sequence of the plurality of SIDs is also a sequence of the plurality of SIDs in the SID list. The sequence of the plurality of SIDs in the SID list is predetermined by nodes that determine the plurality of SIDs. Details are not described herein again.

In addition, it may be predefined that when a bit value of the first bit is a first bit value, the first TLV field needs to be processed, and when the bit value of the first bit is a second bit value, the first TLV field does not need to be processed. Therefore, after determining the first bit, the first segment endpoint node processes the first TLV field if the bit value of the first bit is the first bit value. Correspondingly, if the bit value of the first bit is the second bit value, the first TLV field is not processed.

The first bit value and the second bit value are preset. For example, the first bit value may be 1, and the second bit value may be 0.

The foregoing implementation is used to determine, through the bitmap field, which TLV fields in the TLV fields included in the SRH need to be processed by the first segment endpoint node. It can be learned from the embodiment shown in FIG. 5 that the SRH may further include a TLV type, where the TLV type indicates whether the bitmap field is included. The network node determines, based on the TLV type, whether the TLV fields included in the SRH include the bitmap field. For example, to be compatible with a format of an existing TLV field, a bit may be selected from a type field of the TLV field to indicate whether the bitmap field is carried. Therefore, for the first TLV field in the TLV fields included in the SRH, an implementation in which the network node determines whether the first TLV field includes the bitmap field may be: determining a TLV type of the first TLV field, where the TLV type is used to indicate whether the first TLV field includes the bitmap field. If the TLV type is used to indicate whether the first TLV field includes the bitmap field, an operation of determining, through the bitmap field, whether the first TLV field needs to be processed is performed.

For example, for the first TLV field in the one or more TLV fields, the first segment endpoint node may first determine, based on a bit value of the bit that is in the type field of the first TLV field and that is used to indicate whether the bitmap field is carried, whether the first TLV field includes the bitmap field. If the first TLV field includes the bitmap field, whether the first TLV field needs to be processed may be determined in the foregoing implementation. Correspondingly, if the first TLV field does not include the bitmap field, the first TLV field is directly processed.

A node on the segment routing network may process the specified TLV field in the foregoing step 601 and step 602. However, some nodes on the segment routing network may not have a capability of processing the specified TLV field. Therefore, to ensure smooth execution of step 601 and step 602, for the first segment endpoint node, the first segment endpoint node may further advertise a TLV processing capability notification packet for the specified TLV field on the segment routing network. The TLV processing capability notification packet is used to notify another node on the segment routing network whether the first segment endpoint node has the capability of processing the specified TLV field, so that the another node on the segment routing network may determine, based on the TLV processing capability notification packet, whether the first segment endpoint node has the capability of processing the specified TLV field. If the specified TLV field is the first TLV field, the another node on the segment routing network, for example, a head node, may determine the bit value of the first bit in the bitmap field based on the TLV processing capability notification packet. This part of content has been described in detail in the embodiment shown in FIG. 5. Details are not described herein again.

In addition, because a function of each node on the segment routing network is advertised on the network in advance, an embodiment of this application further provides another packet processing method, to explain how to advertise a TLV processing attribute on the network.

FIG. 8 is a flowchart of another packet processing method according to an embodiment of this application. As shown in FIG. 8, the method includes the following steps.

Step 801: A network node on a segment routing network determines a TLV processing attribute, where the TLV processing attribute is used to indicate whether the network node needs to process TLV fields included in an SRH carried in a received packet.

It can be learned from the embodiment shown in FIG. 5 that, when determining the SRH, the head node on the segment routing network needs to determine the TLV processing attribute of each segment endpoint node. Therefore, network nodes on the segment routing network need to advertise their respective TLV processing attributes in advance, so that other nodes can learn the TLV processing attributes of the network nodes and perform corresponding operations based on the TLV processing attributes.

Step 802: The network node advertises the TLV processing attribute on the segment routing network, so that the another node on the segment routing network stores the TLV processing attribute.

In step 802, the another node on the segment routing network, for example, a head node or a controller, may obtain and store a TLV processing attribute corresponding to a first segment endpoint node, so that the head node subsequently determines, according to the embodiment shown in FIG. 5, the packet carrying the SRH.

In step 801 and step 802, when receiving a packet including the SRH, the first segment endpoint node may determine a TLV processing attribute, so as to quickly and uniformly determine whether to process the TLV fields included in the SRH. Compared with the fact that a TLV processing policy needs to be locally configured on the first segment endpoint node to determine the TLV fields included in the SRH one by one, this embodiment of this application can improve packet processing efficiency of the first segment endpoint node.

It can be learned from the embodiments shown in FIG. 5 and FIG. 6 that the TLV processing attribute may be set in a SID corresponding to the segment endpoint node. Therefore, after the network node advertises the TLV processing attribute, a SID advertisement node may determine the SID corresponding to the first segment endpoint node, where the first segment endpoint node is any segment endpoint node on the segment routing network, so that the first segment endpoint node determines the TLV processing attribute based on the SID corresponding to the first segment endpoint node. The TLV processing attribute includes a first attribute, and the first attribute is used to indicate that the first segment endpoint node needs to process the TLV fields. The TLV processing attribute may further include a second attribute, and the second attribute is used to indicate that the first segment endpoint node does not need to process the TLV fields.

For the first segment endpoint node, the SID advertisement node may be the first segment endpoint node itself. In this case, the network node itself advertises a SID of the network node. The SID advertisement node may also be a controller on the segment routing network. This is not specifically limited herein.

In some embodiments, for any node on the segment routing network, that the TLV processing attribute is set in the SID of the network node includes: The TLV processing attribute is set through a function type of the SID corresponding to the network node. In other words, the function type of the SID can indicate whether the TLV fields need to be processed. In this case, the network node may determine the TLV processing attribute by using the implicit encoding manner in the embodiment in FIG. 6.

In some other embodiments, that the TLV processing attribute is set in the SID of the network node includes: The TLV processing attribute is set through a field in the SID corresponding to the network node. For example, the SID corresponding to the network node includes a TLV processing attribute field, and the TLV processing attribute field is used to indicate whether the TLV fields need to be processed. In this case, the network node may determine the TLV processing attribute by using the display encoding manner in the embodiment in FIG. 6.

Figure 9:
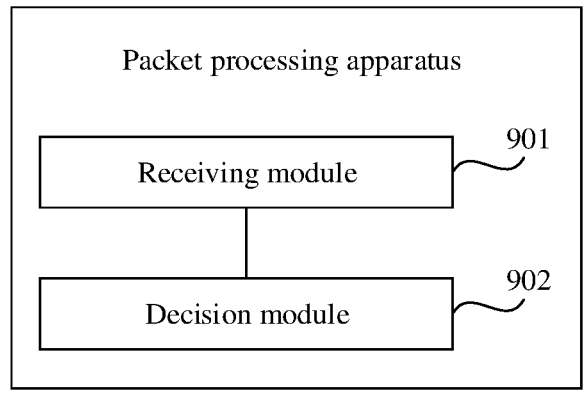
FIG. 9 is a schematic diagram of a packet processing apparatus according to an embodiment of this application.

Refer to FIG. 9. An embodiment of this application provides a packet processing apparatus. The apparatus includes:

a receiving module 901, configured to perform step 601 in the embodiment in FIG. 6; and a decision module 902, configured to perform step 602 in the embodiment in FIG. 6.

Optionally, the SRH further includes a plurality of segment identifiers SIDs that are in a one-to-one correspondence with a plurality of segment endpoint nodes on a forwarding path of the packet. The plurality of segment endpoint nodes are nodes that have a segment routing function on the forwarding path of the packet. A network node is any one of the segment endpoint nodes. A TLV processing attribute is set in a SID corresponding to the network node.

Optionally, that the TLV processing attribute is set in the SID of the network node includes: The TLV processing attribute is set through a function type of the SID corresponding to the network node.

Optionally, that the TLV processing attribute is set in the SID of the network node includes: The TLV processing attribute is set through a field in the SID corresponding to the network node.

Optionally, the decision module is specifically configured to: obtain the TLV processing attribute from the corresponding SID; and if the TLV processing attribute indicates that the TLV fields included in the SRH need to be processed, identify, from the TLV fields included in the SRH, a TLV field processed by the network node, and process the identified TLV field; or if the TLV processing attribute indicates that the TLV fields included in the SRH do not need to be processed, skip processing the TLV fields included in the SRH.

Optionally, the decision module is specifically configured to: determine whether the TLV fields included in the SRH include a bitmap field, where the bitmap field is used to specify a node that processes a TLV field to which the bitmap field belongs; for a TLV field that does not include the bitmap field, treat the TLV field as the TLV field processed by the network node; and for the TLV field that includes the bitmap field, further determine whether the network node is specified as a processing node in the bitmap field, and if the network node is specified as the processing node, use the TLV field to which the bitmap field belongs as the TLV field processed by the network node.

Optionally, the SRH further includes a TLV type, the TLV type indicates whether the bitmap field is included, and the network node determines, based on the TLV type, whether the TLV fields included in the SRH include the bitmap field.

Optionally, the bitmap field includes a plurality of bits in a one-to-one correspondence with each SID in the packet, and a sequence of the plurality of bits corresponds to a sequence of each SID. The decision module is specifically configured to: obtain a remaining node SL field included in the SRH of the packet, where the SL field can indicate a quantity of remaining segment endpoint nodes that do not participate in packet forwarding on the forwarding path; determine, based on the quantity indicated by the SL field, a bit corresponding to the network node; and determine whether the bit corresponding to the network node specifies the network node as the processing node.

Optionally, the apparatus further includes: a sending module, configured to advertise a TLV processing capability notification packet on a segment routing network, so that another node on the segment routing network determines, based on the TLV processing capability notification packet, whether the network node has a capability of processing a TLV field.

It should be noted that division of the foregoing function modules is only described as an example during packet processing by the packet processing apparatus provided in the foregoing embodiments. In actual application, the foregoing functions may be allocated, based on a requirement, to be implemented by different function modules, to be specific, an internal structure of the device is divided into different function modules to implement all or some of the functions described above. In addition, the packet processing apparatus in the foregoing embodiments and the packet processing method in the embodiment in the FIG. 6 pertain to a same concept. For a specific implementation process, refer to the method embodiments. Details are not described herein.

Figure 10:
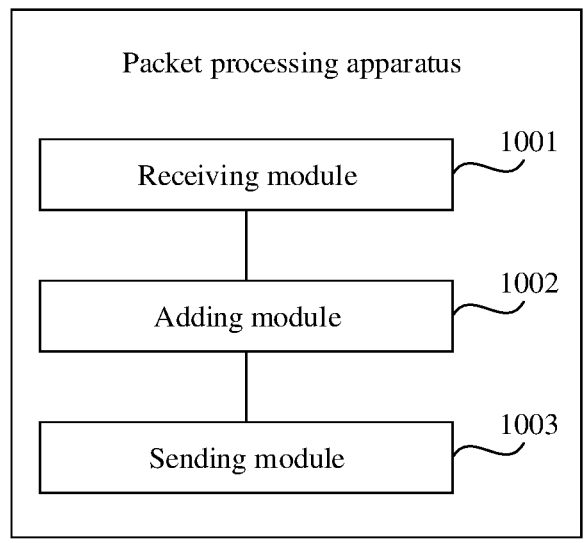
FIG. 10 is a schematic diagram of another packet processing apparatus according to an embodiment of this application.

Refer to FIG. 10. An embodiment of this application provides another packet processing apparatus. The apparatus includes:

a receiving module 1001, configured to perform step 501 in the embodiment in FIG. 5;

an adding module 1002, configured to perform step 502 in the embodiment in FIG. 5; and a sending module 1003, configured to perform step 503 in the embodiment in FIG. 5.

Optionally, the SRH further includes a plurality of segment identifiers SIDs that are in a one-to-one correspondence with a plurality of segment endpoint nodes on a forwarding path of a packet, and the plurality of segment endpoint nodes are nodes that have a segment routing function on the forwarding path of the packet. A TLV processing attribute is set in a SID corresponding to each segment endpoint node.

Optionally, that the TLV processing attribute is set in the SID corresponding to each segment endpoint node includes: The TLV processing attribute is set through a function type of the SID of each segment endpoint node.

Optionally, that the TLV processing attribute is set in the SID of each segment endpoint node includes: The TLV processing attribute is set through a field in the SID of each segment endpoint node.

Optionally, when the TLV processing attribute indicates that the TLV fields included in the SRH need to be processed, the SRH further indicates a processing node of each TLV field included in the SRH.

Optionally, the TLV fields in the SRH include a bitmap field, and the bitmap field is used to specify a node that processes a TLV field to which the bitmap field belongs.

Optionally, the SRH further includes a TLV type, and the TLV type indicates whether the bitmap field is included.

Optionally, the receiving module is further configured to receive a TLV processing capability notification packet advertised by another node, where the TLV processing capability notification packet is used to indicate whether the another node has a capability of processing the first TLV field. The another node is any one of the plurality of segment endpoint nodes on the forwarding path of the packet. The processing node that is of each TLV field included in the SRH and that is indicated in the SRH is determined based on the TLV processing capability notification packet.

It should be noted that division of the foregoing function modules is only described as an example during packet processing by the packet processing apparatus provided in the foregoing embodiments. In actual application, the foregoing functions may be allocated, based on a requirement, to be implemented by different function modules, to be specific, an internal structure of the device is divided into different function modules to implement all or some of the functions described above. In addition, the packet processing apparatus in the foregoing embodiments and the packet processing method in the embodiment in the FIG. 5 pertain to a same concept. For a specific implementation process, refer to the method embodiments. Details are not described herein.

Figure 11:
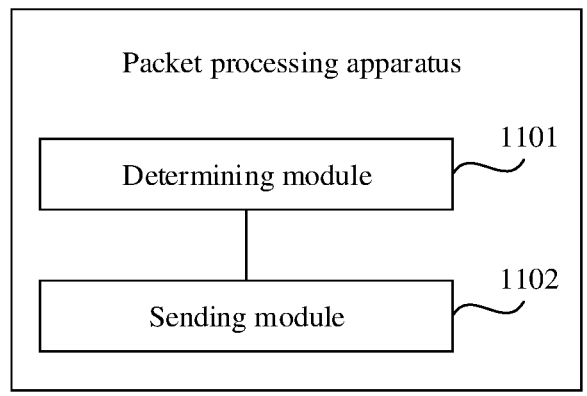
FIG. 11 is a schematic diagram of another packet processing apparatus according to an embodiment of this application.

Refer to FIG. 11. An embodiment of this application provides another packet processing apparatus. The apparatus includes:

a determining module, configured to perform step 801 in the embodiment in FIG. 8; and a sending module, configured to perform step 802 in the embodiment of FIG. 8.

Optionally, a TLV processing attribute is set in a SID corresponding to a network node.

Optionally, that the TLV processing attribute is set in the SID of the network node includes: The TLV processing attribute is set through a function type of the SID corresponding to the network node.

Optionally, that the TLV processing attribute is set in the SID of the network node includes: The TLV processing attribute is set through a field in the SID corresponding to the network node.

It should be noted that division of the foregoing function modules is only described as an example during packet processing by the packet processing apparatus provided in the foregoing embodiments. In actual application, the foregoing functions may be allocated, based on a requirement, to be implemented by different function modules, to be specific, an internal structure of the device is divided into different function modules to implement all or some of the functions described above. In addition, the packet processing apparatus in the foregoing embodiments and the packet processing method in the embodiment in the FIG. 8 pertain to a same concept. For a specific implementation process, refer to the method embodiments. Details are not described herein.

All or some of the foregoing embodiments may be implemented through software, hardware, firmware, or any combination thereof. When software is used to implement the embodiments, the embodiments may be implemented all or partially in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (Solid State Disk, SSD)), or the like.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A method comprising:

receiving, by a network node, a packet carrying a segment routing header (SRH), wherein the SRH comprises one or more type-length-value (TLV) fields and a plurality of segment identifiers (SIDs) that are in a one-to-one correspondence to a plurality of segment endpoint nodes on a forwarding path of the packet, the plurality of segment endpoint nodes are nodes that have a segment routing function on the forwarding path of the packet, the network node is one of the segment endpoint nodes, a SID of the plurality of SIDS that corresponds to the network node comprises a TLV processing attribute that indicates to the network node to process the one or more TLV fields comprised in the SRH, and processing the one or more TLV fields comprises performing a subsequent operation based on indication information carried in the one or more TLV fields;

determining, by the network node based on the TLV processing attribute corresponding to the network node, to process the one or more TLV fields comprised in the SRH; and processing, by the network node based on determining to process the one or more TLV fields comprised in the SRH, the one or more TLV fields comprised in the SRH by performing a subsequent operation based on the indication information carried in the one or more TLV fields.

2. The method according to claim 1, wherein the TLV processing attribute corresponding to the network node is indicated through a function type of the SID corresponding to the network node.

3. The method according to claim 1, wherein the TLV processing attribute corresponding to the network node is indicated through a field in the SID corresponding to the network node.

4. The method according to claim 1, wherein determining, by the network node based on the TLV processing attribute corresponding to the network node, to process the one or more TLV fields comprised in the SRH comprises:
obtaining, by the network node, the TLV processing attribute corresponding to the network node from the SID corresponding to the network node; and
when the TLV processing attribute corresponding to the network node indicates that the one or more TLV fields comprised in the SRH are to be processed, identifying, by the network node from the one or more TLV fields comprised in the SRH, a TLV field to be processed by the network node.

5. The method according to claim 4, wherein the method further comprises:
advertising, by the network node, a TLV processing capability notification packet for a specified TLV field on the segment routing network, the TLV processing capability notification packet indicating whether the network node has a capability of processing the specified TLV field.

6. A method comprising:
receiving, by a network node, a packet, wherein the network node is a node at an ingress of a segment routing network;
adding, by the network node, a segment routing header (SRH) to the packet, wherein the SRH comprises one or more TLV fields and a plurality of segment identifiers (SIDs) that are in a one-to-one correspondence to a plurality of segment endpoint nodes on a forwarding path of the packet, the plurality of segment endpoint nodes are nodes that have a segment routing function on the forwarding path of the packet, and each SID of the plurality of SIDs comprises a TLV processing attribute that indicates to a node corresponding to the respective SID to process the one or more TLV fields comprised in the SRH, and processing the one or more TLV fields comprises performing a subsequent operation based on indication information carried in the one or more TLV fields; and
sending, by the network node, the packet after the SRH is added;
wherein when at least one TLV processing attribute of the plurality of SIDs indicates that the one or more TLV fields comprised in the SRH are to be processed by a corresponding segment endpoint node, the SRH further comprises, in each TLV field of the one or more TLV fields, an indication that indicates at least one processing node for processing the respective TLV field.

7. The method according to claim 6, wherein the TLV processing attribute of each SID of the plurality of SIDs is indicated through a function type of the SID.

8. The method according to claim 6, wherein the TLV processing attribute of each SID of the plurality of SIDs is indicated through a field in the SID.

9. The method according to claim 6, wherein each indication comprises a bitmap field, and each bitmap field specifies a node that is to process a TLV field to which the bitmap field belongs.

10. The method according to claim 9, wherein the SRH further comprises a TLV type, and the TLV type indicates whether the one or more bitmap fields are comprised in the SRH.

11. The method according to claim 6, wherein the method further comprises:
receiving, by the network node, a TLV processing capability notification packet that is for a specified TLV field and that is advertised by another node, wherein the TLV processing capability notification packet indicates whether the another node has a capability of processing the specified TLV field, and the another node is one of the plurality of segment endpoint nodes on the forwarding path of the packet; and
wherein for each TLV field of the one or more TLV fields, the indication that indicates the at least one processing node for processing the respective TLV field is determined based on the TLV processing capability notification packet.

12. An apparatus, wherein the apparatus comprises a memory and at least one processor, wherein the memory is configured to store instructions, and the at least one processor is configured to execute the instructions in the memory, to cause the apparatus to:
receive a packet carrying a segment routing header (SRH), wherein the SRH comprises one or more type-length-value (TLV) fields and a plurality of segment identifiers (SIDs) that are in a one-to-one correspondence to a plurality of segment endpoint nodes on a forwarding path of the packet, the plurality of segment endpoint nodes are nodes that have a segment routing function on the forwarding path of the packet, each SID of the plurality of SIDs comprises a TLV processing attribute that indicates to a node corresponding to the respective SID to process the one or more TLV fields comprised in the SRH, and processing the one or more TLV fields comprises performing a subsequent operation based on indication information carried in the one or more TLV fields;
determine, based on the TLV processing attribute corresponding to the apparatus, to process the one or more TLV fields comprised in the SRH; and
process, based on determining to process the one or more TLV fields comprised in the SRH, the one or more TLV fields comprised in the SRH by performing a subsequent operation based on indication information carried in the one or more TLV fields.

13. The apparatus according to claim 12, wherein the TLV processing attribute corresponding to the apparatus is indicated through a function type of the SID corresponding to the apparatus.

14. The apparatus according to claim 12, wherein the TLV processing attribute corresponding to the apparatus is indicated through a field in the SID corresponding to the apparatus.

15. The apparatus according to claim 12, wherein the apparatus is further caused to:
obtain the TLV processing attribute corresponding to the apparatus from the SID corresponding to the apparatus; and
when the TLV processing attribute corresponding to the apparatus indicates that the one or more TLV fields comprised in the SRH are to be processed, identify, from the one or more TLV fields comprised in the SRH, a TLV field to be processed by the apparatus.

16. The apparatus according to claim 15, wherein the apparatus is further caused to:

advertise a TLV processing capability notification packet for a specified TLV field on a segment routing network, the TLV processing capability notification packet indicating whether the apparatus has a capability of processing the specified TLV field.

* * * * *